(12) United States Patent
Mergen

(10) Patent No.: US 7,270,892 B2
(45) Date of Patent: Sep. 18, 2007

(54) FRICTION BEARING

(75) Inventor: Robert Mergen, Altmünster (AT)

(73) Assignee: Miba Gleitlager GmbH, Laakirchen (AT)

( * ) Notice: Subject to any disclaimer, the term of this patent is extended or adjusted under 35 U.S.C. 154(b) by 0 days.

(21) Appl. No.: 11/361,389

(22) Filed: Feb. 24, 2006

(65) Prior Publication Data
US 2006/0199034 A1    Sep. 7, 2006

(30) Foreign Application Priority Data
Mar. 3, 2005   (AT) ................ A 366/2005

(51) Int. Cl.
F16C 33/12   (2006.01)
C22C 9/02    (2006.01)

(52) U.S. Cl. ............ 428/677; 420/476; 384/912

(58) Field of Classification Search ............ None
See application file for complete search history.

(56) References Cited

U.S. PATENT DOCUMENTS 2,885,532 A * 5/1959 Fike ............ 219/107
3,808,659 A * 5/1974 Alger et al. ............ 29/888.061
3,841,724 A * 10/1974 Calabrese ............ 384/625
3,923,500 A * 12/1975 Kitazawa et al. ............ 420/475
4,000,981 A * 1/1977 Sugafuji et al. ............ 75/230
4,042,204 A * 8/1977 Loebs et al. ............ 249/57
4,169,730 A * 10/1979 Matthews et al. ............ 420/476
4,879,094 A * 11/1989 Rushton ............ 420/476
5,286,444 A * 2/1994 Tomikawa et al. ............ 420/491
5,288,457 A * 2/1994 Boegel ............ 420/470
2004/0048094 A1* 3/2004 Rubel et al. ............ 428/650

FOREIGN PATENT DOCUMENTS

DE    103 08 779 B3   11/2004
EP    0457 478 B1     11/1991
JP    2002-60868   *  2/2002

* cited by examiner

Primary Examiner—John J. Zimmerman
(74) Attorney, Agent, or Firm—Collard & Roe, P.C.

(57) ABSTRACT

The invention describes a friction bearing with a steel support shell and a lead-free bearing metal layer on the basis of copper with the main alloy elements of tin and zinc, which layer is applied to the support shell. In order to combine advantageous sliding properties with favorable mechanical resilience it is proposed that the bearing metal layer has a share of tin of 2.5 to 11% by weight and a share of zinc of 0.5 to 5% by weight, with the sum total of the shares of tin and zinc being between 3 and 13% by weight.

2 Claims, 2 Drawing Sheets

FRICTION BEARING

CROSS REFERENCE TO RELATED APPLICATIONS

Applicant claims priority under 35 U.S.C. §119 of Austrian Patent No. A 366/2005 filed Mar. 3, 2005.

1. Field of the Invention

The invention relates to a friction bearing with a steel support shell and a lead-free bearing metal layer on the basis of copper with the main alloy elements of tin and zinc, which layer is applied to the support shell.

2. Description of the Prior Art

Friction bearing materials on the basis of copper with tin and zinc as the main alloy elements have long been known. A comparatively high amount of lead was added to the alloy of these bearing materials in order to improve the tribological properties. The toxicity of lead alloys is increasingly becoming out of favor for the use of such bearing materials. For this reasons there have been numerous efforts to develop lead-free friction bearing materials of the basis of copper with tin and zinc as the main alloy elements. However, an impaired tribological suitability was seen as compared with bearing materials made of leaded bronze. It was proposed for example (DE 103 08 779 B3) to improve a lead-free copper alloy, comprising at least 21.3% by weight of zinc and not more than 3.5% by weight of tin, in its sliding properties by adding magnesium, iron or cobalt, nickel and manganese or silicon. This did not prove to be exceptionally successful. Similar insufficient sliding properties are obtained by another known lead-free copper alloy with zinc and silicon as the main alloy components (DE 103 08 778 B3), with at least 8.5% by weight of zinc, 1 to 5% by weight of silicon and not more than 2% by weight of tin are added to the copper with minute shares of iron or cobalt, nickel and manganese. If finally the addition of lead is avoided in a copper alloy with a tin content of 6% by weight for example by adding bismuth in a magnitude of 0.5 to 2% by weight (EP 0 457 478 B1), then it is possible to improve the tribological properties, but it is necessary to accept a low corrosion-resistance which prevents a successful use of such bearing materials.

SUMMARY OF THE INVENTION

The invention is thus based on the object of providing a friction bearing of the kind mentioned above with a lead-free bearing metal layer on the basis of copper which meets both the tribological properties as well as the strength requirements so that such friction bearings can be used especially in the manufacture of internal combustion engines.

This object is achieved by the invention in such a way that the bearing metal layer has a share of tin of 2.5 to 11% by weight and a share of zinc of 0.5 to 5% by weight, with the sum total of the shares of tin and zinc being between 3 and 13% by weight.

It was noticed surprisingly that in the stated share ranges of tin and zinc the demands on the sliding properties of the bearing metal layer and on the mechanical resilience of the bearing can certainly be fulfilled. Hardening effects will not yet occur under a limitation of the share of tin to not more than 11% by weight. Moreover, phase compositions giving rise to embrittlement are also not yet expected. The zinc represents a suitable replacement for the phosphorus used otherwise. As a result of the formation of intermetallic iron-phosphorus compounds, it could have a disadvantageous effect on the bond of the bearing metal layer with the steel support shell. Lead-free bearing metal layers on the basis of copper with the indicated shares of tin and zinc thus represent alloys which can be managed very well from the viewpoint of the casting and sintering techniques, so that they are especially suitable for plating by casting or sintering on steel.

In order to improve the properties of the bearing metal layer in conjunction with the steel support shell, the bearing metal layer can comprise at least one further element of an element group containing cobalt, manganese and zirconium, in a total concentration of between 0.1 and 1.8% by weight relating to the employed elements of this group. In this quantity, no or only very low quantities of primary released phases are formed which are negligible in their effect and which has an advantageous effect on the pourability and the production of a sintering powder. Intermetallic phases causing an increase in the strength can be achieved by limiting the shares of these alloy elements without having to fear any embrittlement. Moreover, the obstruction of recrystallization especially by zirconium is advantageous in a number of vendor-specific heat treatments of the bearing metal layer.

In addition to cobalt, manganese and zirconium it is also possible to add titanium, magnesium and phosphorus to the alloy. The total concentration of these elements should lie between 0.05 and 1.7% by weight, at a maximum phosphorus concentration of 0.08% by weight. In addition to the cooperation in the formation of respective order states in the solid state, these elements have a deoxidizing effect and allow guiding the metallurgical process with a minimum of otherwise unavoidable additions of phosphorus. An additional factor is that especially titanium and also zirconium prevent an embrittlement by ageing at operating temperatures of up to 150° C. expected by the use of friction bearing in the construction of internal combustion engines. This has an advantageous effect on the service life of the friction bearings.

BRIEF DESCRIPTION OF THE DRAWINGS

The drawings show known friction bearings with a bearing metal layer on the basis of copper and lead in comparison with a friction bearing in accordance with the invention with a lead-free bearing metal layer, wherein.

DESCRIPTION OF THE PREFERRED EMBODIMENTS

Figure 1:
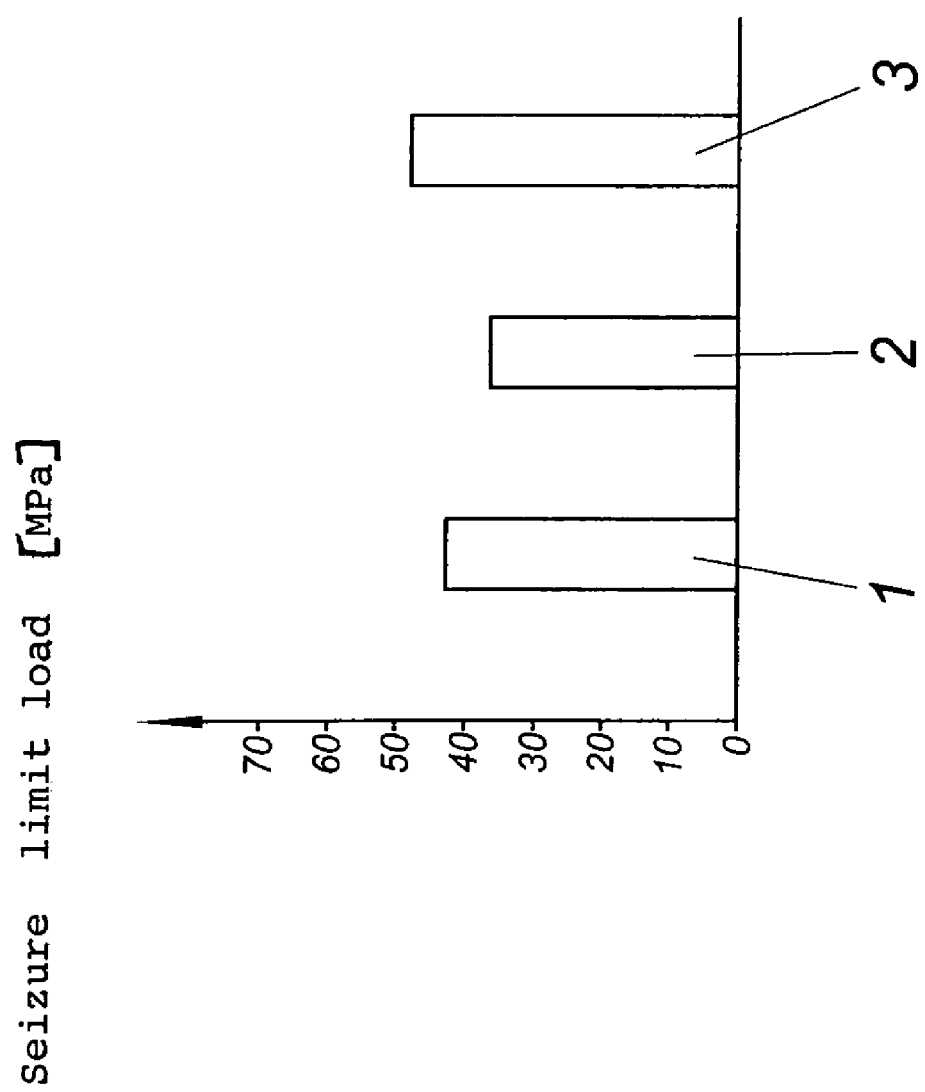
FIG. 1 shows the limit load for the occurrence of seizure in a block diagram.

A series of several friction bearings of the same design were subjected to a static load under comparable conditions, which load was increased in steps until the occurrence of seizure. The average limit load for seizure as calculated for all friction bearings of the respective series from the limit loads as measured in MPa from the occurrence of seizure were entered in the block diagram according to FIG. 1. The bearings had a diameter of 48 mm and a bearing width of 21 mm. The seizure inclination was determined at a revolving speed of the shaft of 12.6 m/s and a working temperature of 120° C. The block diagram 1, which was determined for a bearing metal layer made of CuPb20Sn2, shows an average limit load for seizures of 43 MPa. An average limit load for seizures of 37 MPa is obtained for a bearing metal layer made of CuPb15Sn7 according to the block diagram 2. An average limit load for seizures of 48 MPa is obtained in a bearing metal layer according to the invention which was applied onto a steel support shell as in the comparative bearings, which bearing metal layer has a composition of 4% by weight of tin, 1% by weight of zinc, 0.04% of weight of manganese, 0.08% by weight of zirconium, 0.05% by weight of phosphorus, 0.11% by weight of magnesium, 0.05% by weight of titanium and the remainder copper, as indicated in block diagram 3.

Figure 2:
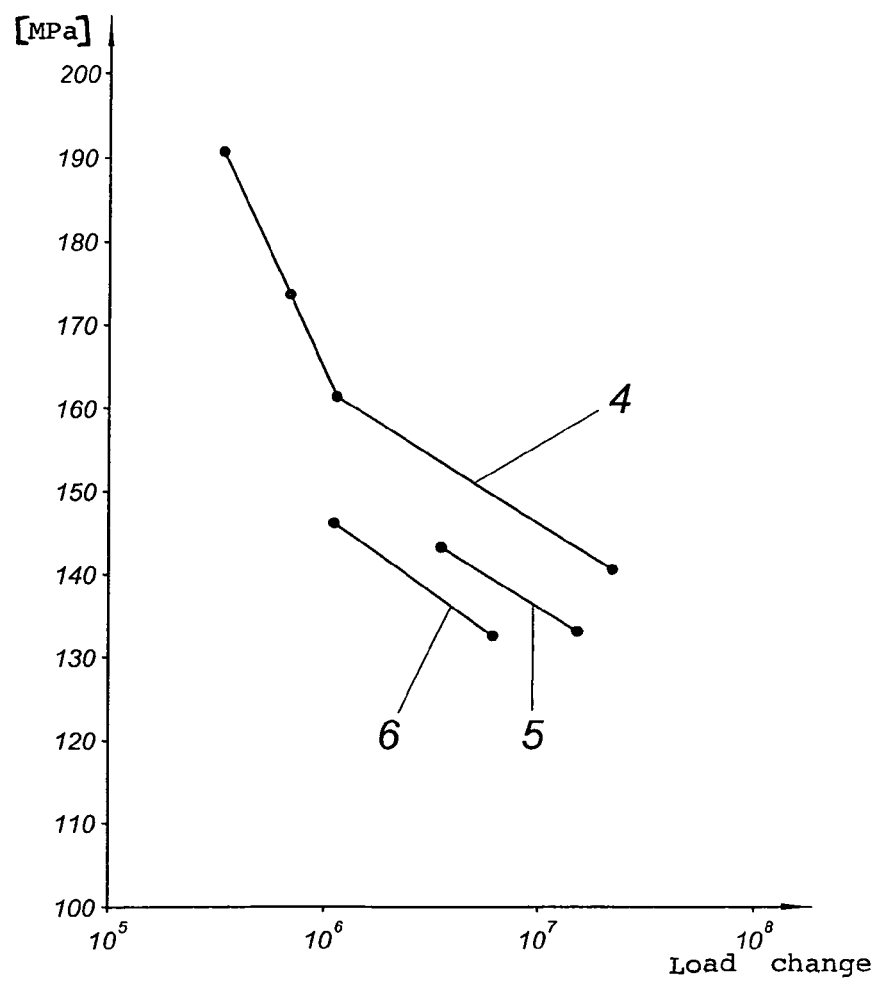
FIG. 2 shows a diagram of the progress of the alternate bending strength over the number of load changes.

In the diagram according to FIG. 2, the ordinate shows the fatigue strength under reversed bending stresses in MPa and the abscissa shows the number of the load changes on a logarithmic scale for the friction bearings which were also examined with respect to the inclination towards seizing. It was seen that the fatigue strength under reversed bending stresses is considerably higher for inventive friction bearings according to curve 4 than for the friction bearings with a lead-containing bearing metal layer. Curve 5 applies to friction bearings with a bearing metal layer made of CuPb20Sn2 and the curve 6 for friction bearings with a bearing metal layer made of CuPb15Sn7.

The invention claimed is:

1. A friction bearing with a steel support shell and a lead-free bearing metal layer on the basis of copper with the main alloy elements of tin and zinc, which layer is applied to the support shell, wherein the bearing metal layer has a share of tin of 2.5 to 11% by weight and a share of zinc of 0.5 to 5% by weight, with the sum total of the shares of tin and zinc being between 3 and 13% by weight, and wherein the bearing metal layer comprises at least one element from the group consisting of cobalt, manganese and zirconium, in a total concentration of between 0.1 and 1.8% by weight relating to the employed elements of this group.

2. A friction bearing according to claim 1, wherein the bearing metal layer contains at least one element of an element group containing titanium, magnesium and phosphorus, in a total concentration of between 0.05 and 1.7% by weight relating to the employed elements of this group, at a maximum concentration of phosphorus of 0.08% by weight.

* * * * *